(12) United States Patent
Barlock et al.

(10) Patent No.: US 8,227,937 B2
(45) Date of Patent: Jul. 24, 2012

(54) UNINTERRUPTIBLE POWER SUPPLIES, SOLAR POWER KITS FOR UNINTERRUPTIBLE POWER SUPPLIES AND RELATED METHODS

(75) Inventors: Paul Regis Barlock, Blaine, WA (US); Matthew Kenneth Donnelly, Gallatin Gateway, MT (US)

(73) Assignee: NNW Ventures, LLC, Blaine, WA (US)

( * ) Notice: Subject to any disclaimer, the term of this patent is extended or adjusted under 35 U.S.C. 154(b) by 308 days.

(21) Appl. No.: 12/493,079

(22) Filed: Jun. 26, 2009

(65) Prior Publication Data

US 2010/0019577 A1   Jan. 28, 2010

Related U.S. Application Data

(60) Provisional application No. 61/133,702, filed on Jul. 2, 2008.

(51) Int. Cl.
   *H02J 7/00* (2006.01)
(52) U.S. Cl. .......................................... 307/66
(58) Field of Classification Search ............... 307/66
   See application file for complete search history.

(56) References Cited

U.S. PATENT DOCUMENTS

| | | | |
|---|---|---|---|
| 4,916,328 A * | 4/1990 | Culp, III | 307/39 |
| 5,701,067 A | 12/1997 | Kaji et al. | |
| 5,896,281 A | 4/1999 | Bingley | |
| 6,184,593 B1 | 2/2001 | Jungreis | |
| 6,847,130 B1 | 1/2005 | Belehradek et al. | |
| 6,949,843 B2 * | 9/2005 | Dubovsky | 307/64 |
| 7,177,168 B2 * | 2/2007 | Toyomura et al. | 363/131 |
| 7,612,472 B2 * | 11/2009 | Mutabdzija et al. | 307/150 |
| 7,886,173 B2 * | 2/2011 | Krieger et al. | 713/330 |
| 2007/0076444 A1 | 4/2007 | McNulty et al. | |
| 2007/0156257 A1 * | 7/2007 | Peters | 700/22 |
| 2008/0111424 A1 | 5/2008 | Yeh | |
| 2008/0185915 A1 * | 8/2008 | Wang | 307/64 |
| 2008/0217998 A1 | 9/2008 | Parmley | |
| 2008/0278003 A1 * | 11/2008 | Pouchet et al. | 307/66 |
| 2009/0192655 A1 | 7/2009 | Ichikawa et al. | |

FOREIGN PATENT DOCUMENTS

| | | |
|---|---|---|
| JP | 09-084278 | 3/1997 |
| JP | 2001-008383 | 1/2001 |
| JP | 2008-054439 | 3/2008 |
| WO | PCT/US2009/048949 | 1/2011 |

OTHER PUBLICATIONS

PCT/US2009/048949; completed Feb. 10, 2010; International Search Report; 3 pp.
PCT/US2009/048949; completed Feb. 10, 2010; Written Opinion; 4 pp.

* cited by examiner

*Primary Examiner* — Michael Rutland Wallis
(74) *Attorney, Agent, or Firm* — Wells St. John, P.S.

(57) ABSTRACT

Uninterruptible power supplies, solar power kits for uninterruptible power supplies and related methods are described. According to one aspect, an uninterruptible power supply includes a power bus, mains circuitry configured to rectify electrical energy received from a mains supply system into rectified electrical energy and to provide the rectified electrical energy to a power bus of the uninterruptible power supply, photovoltaic circuitry configured to convert solar energy into converted electrical energy and to provide the converted electrical energy to the power bus, a battery system configured to receive electrical energy from the power bus to charge a battery of the battery system and to discharge electrical energy to the power bus, an inverter configured to provide electrical energy from the power bus to the load, and a controller configured to monitor the photovoltaic circuitry and to implement at least one operation of the uninterruptible power supply using the monitoring.

23 Claims, 12 Drawing Sheets

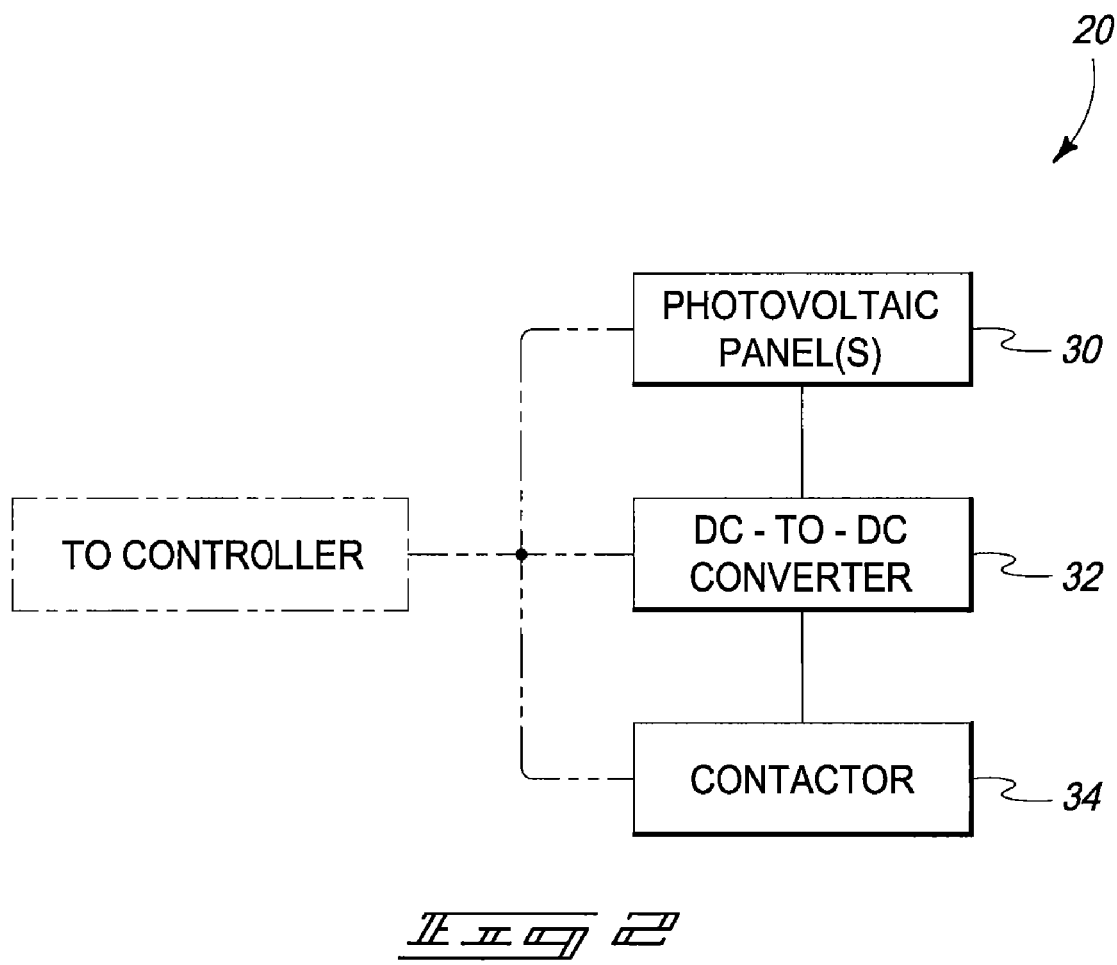

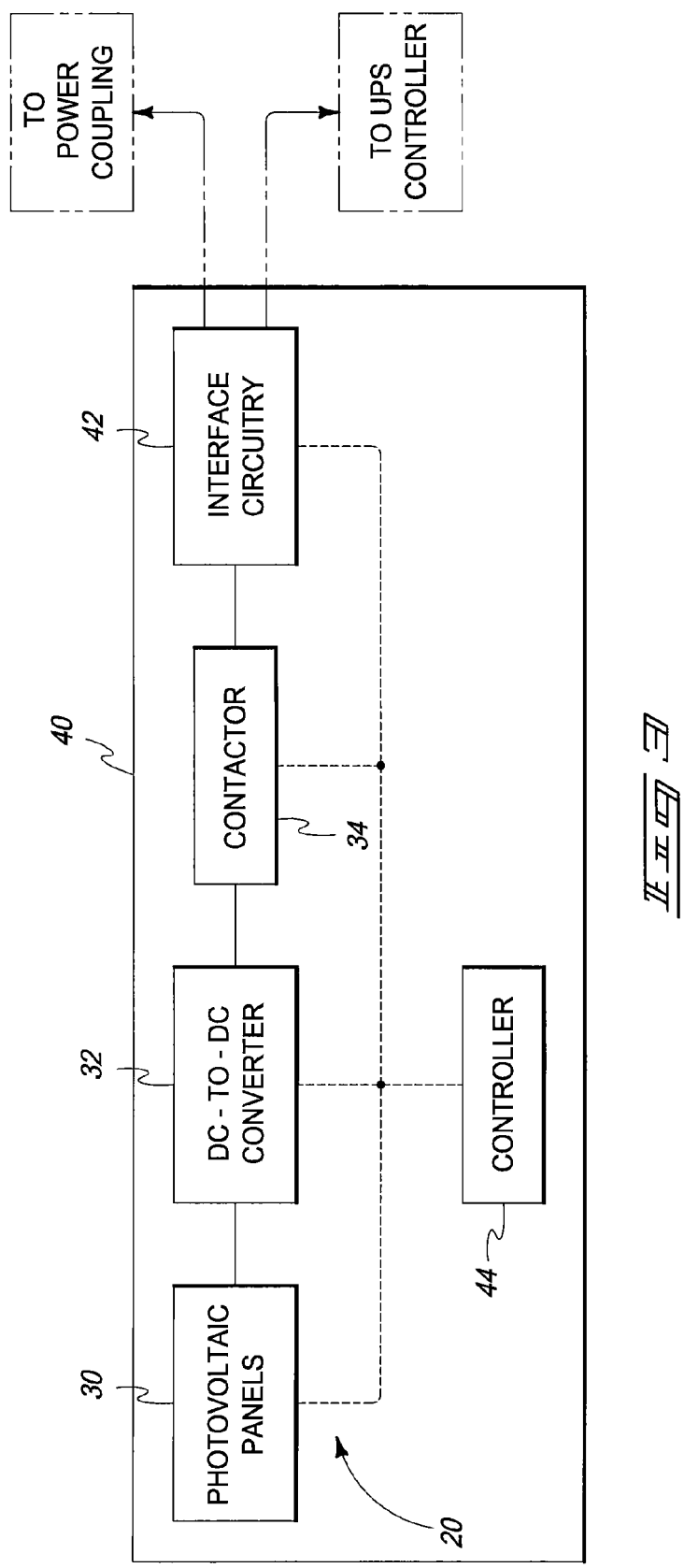

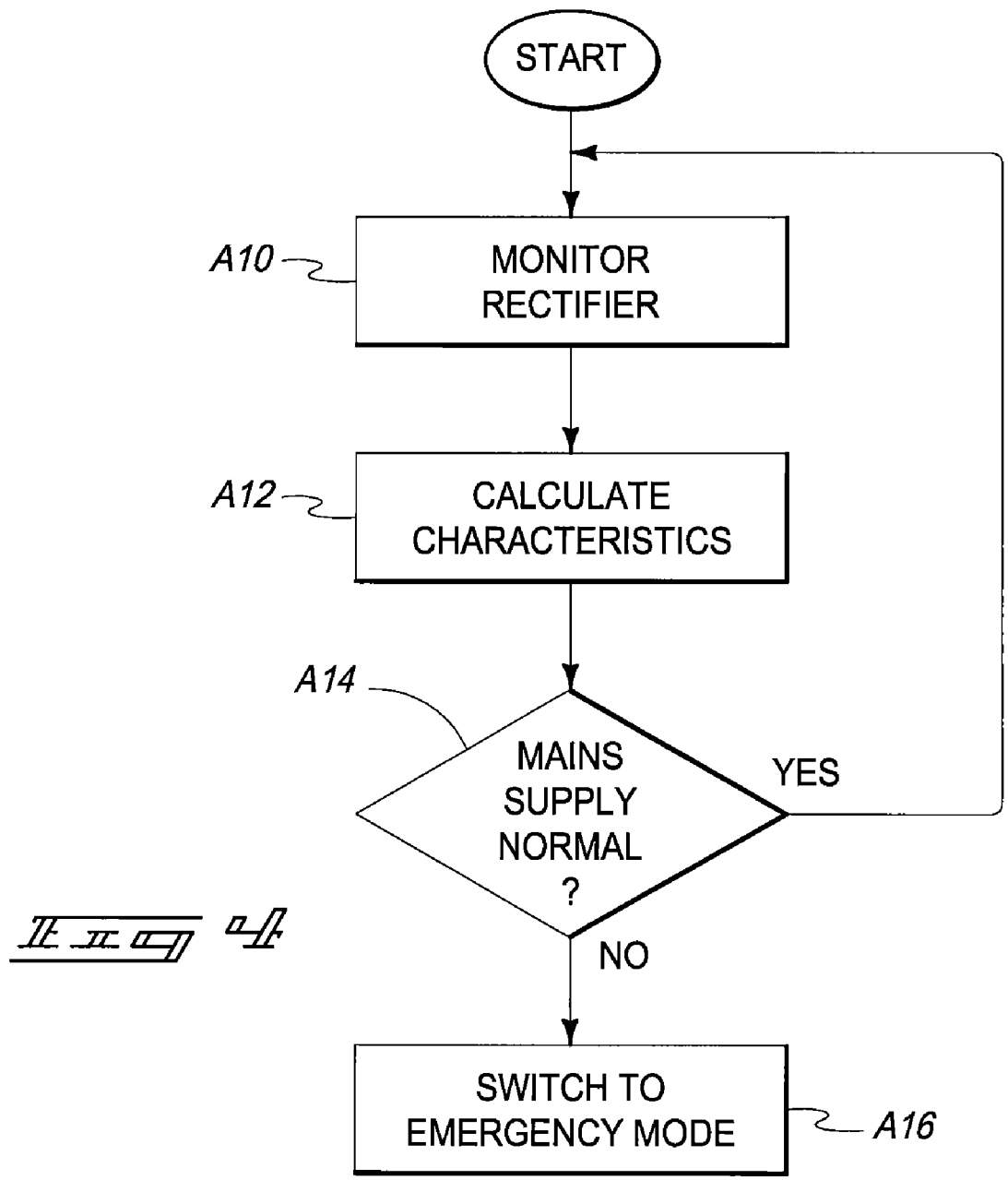

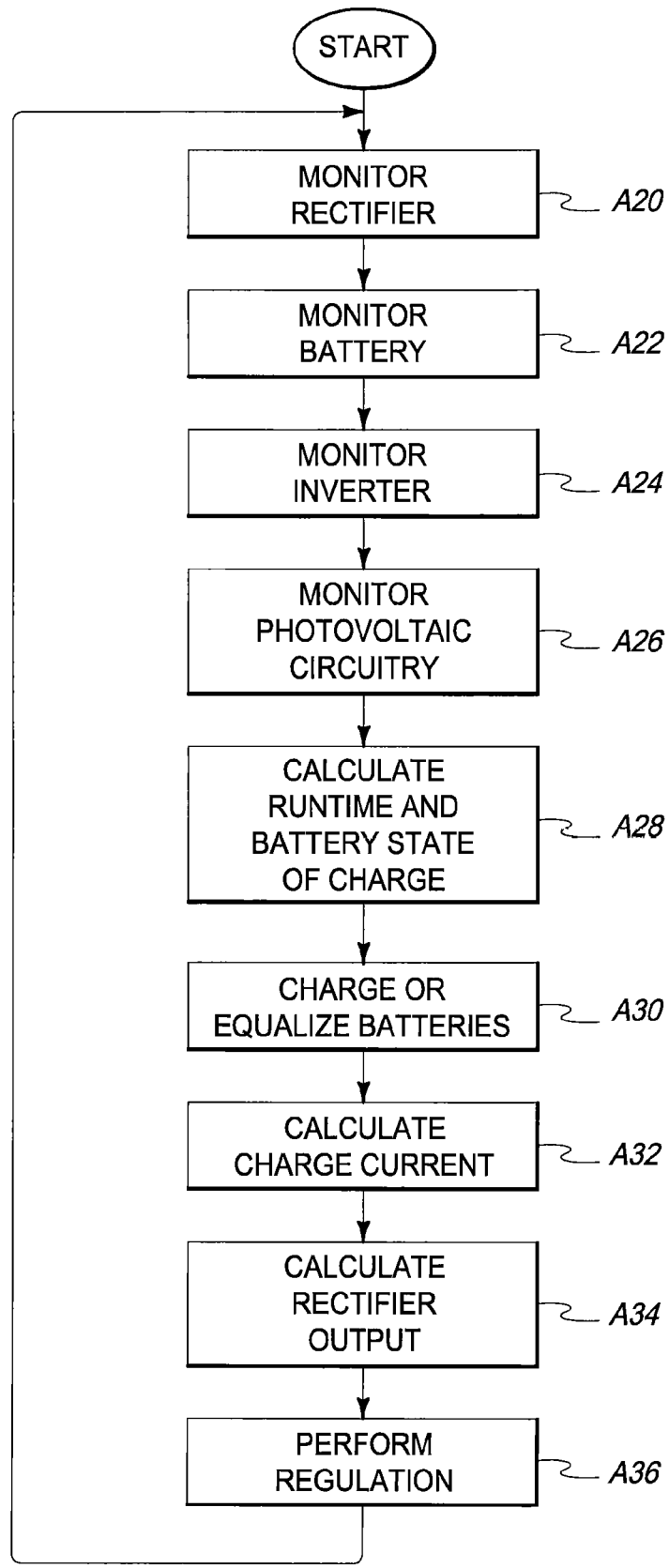

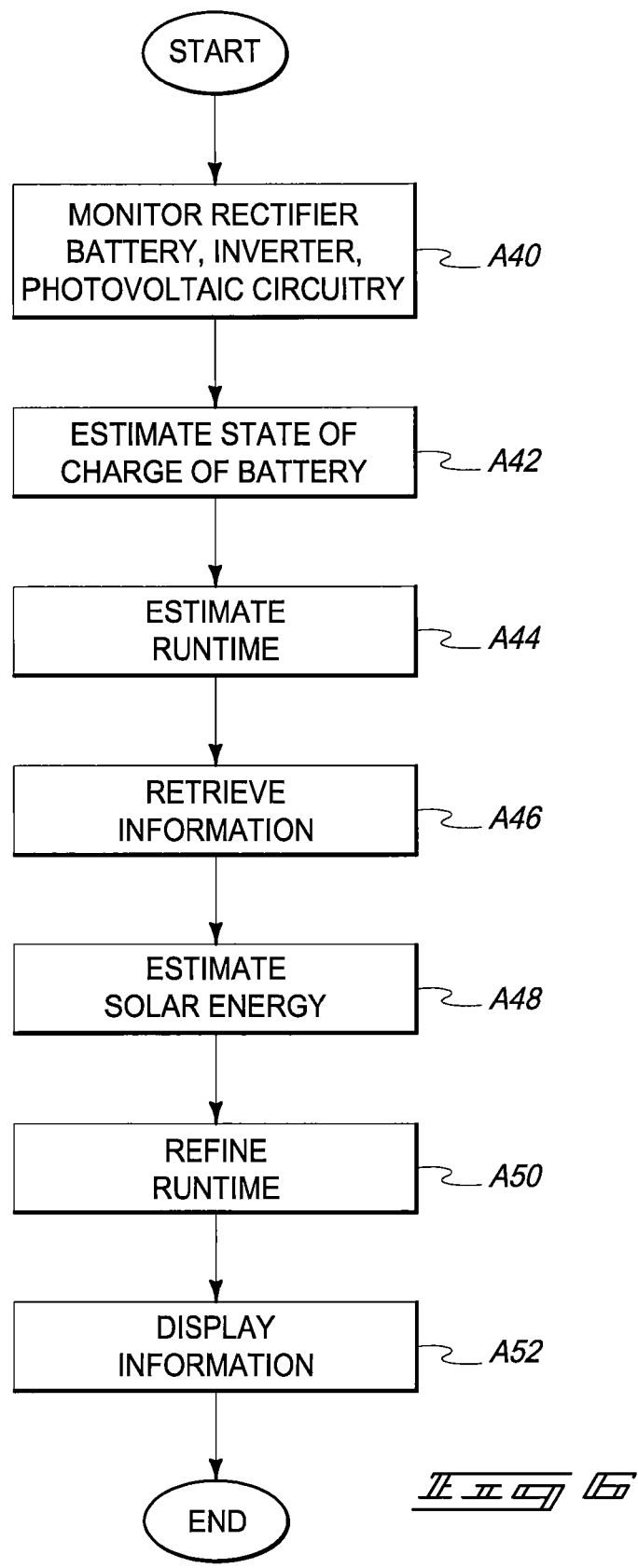

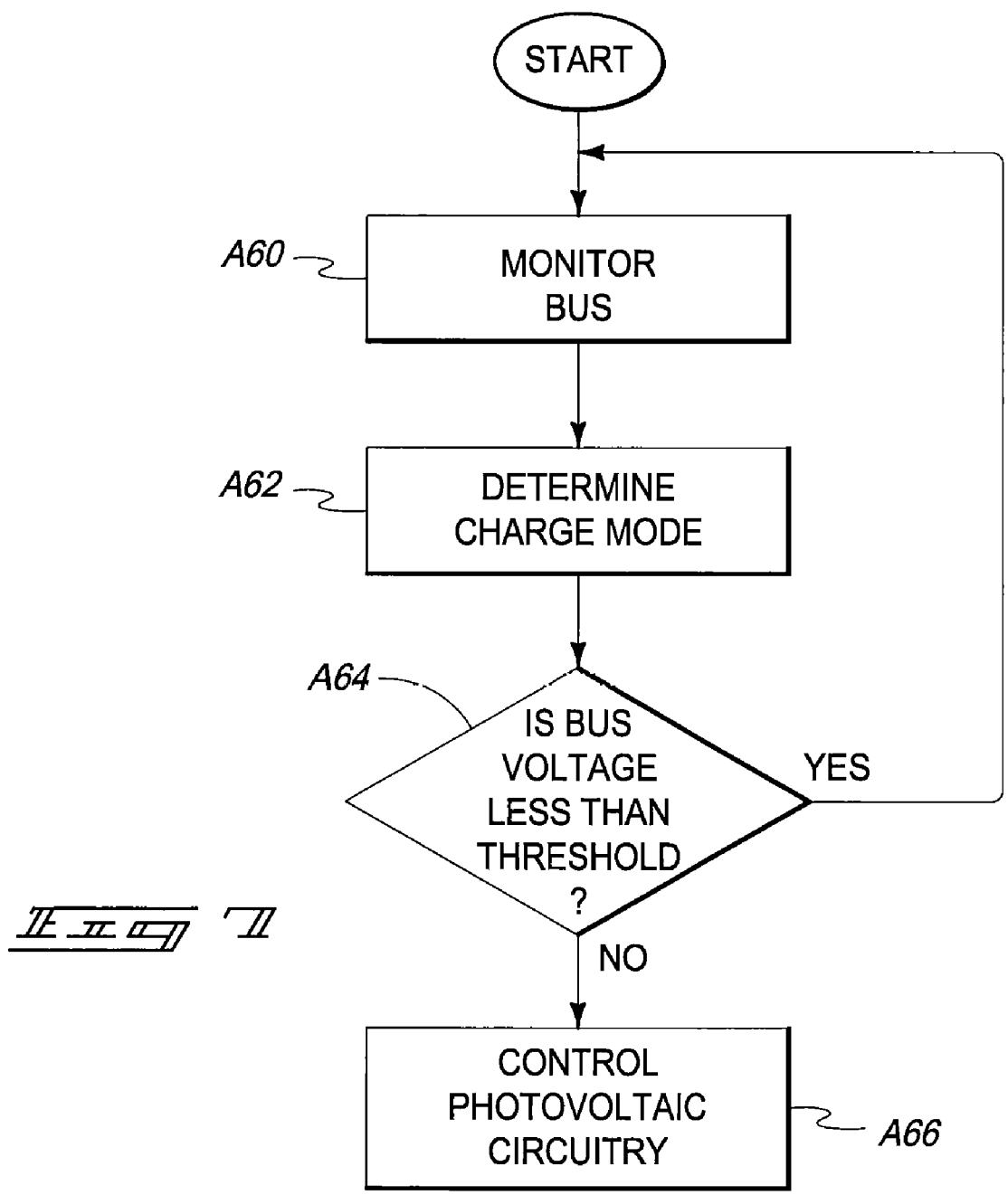

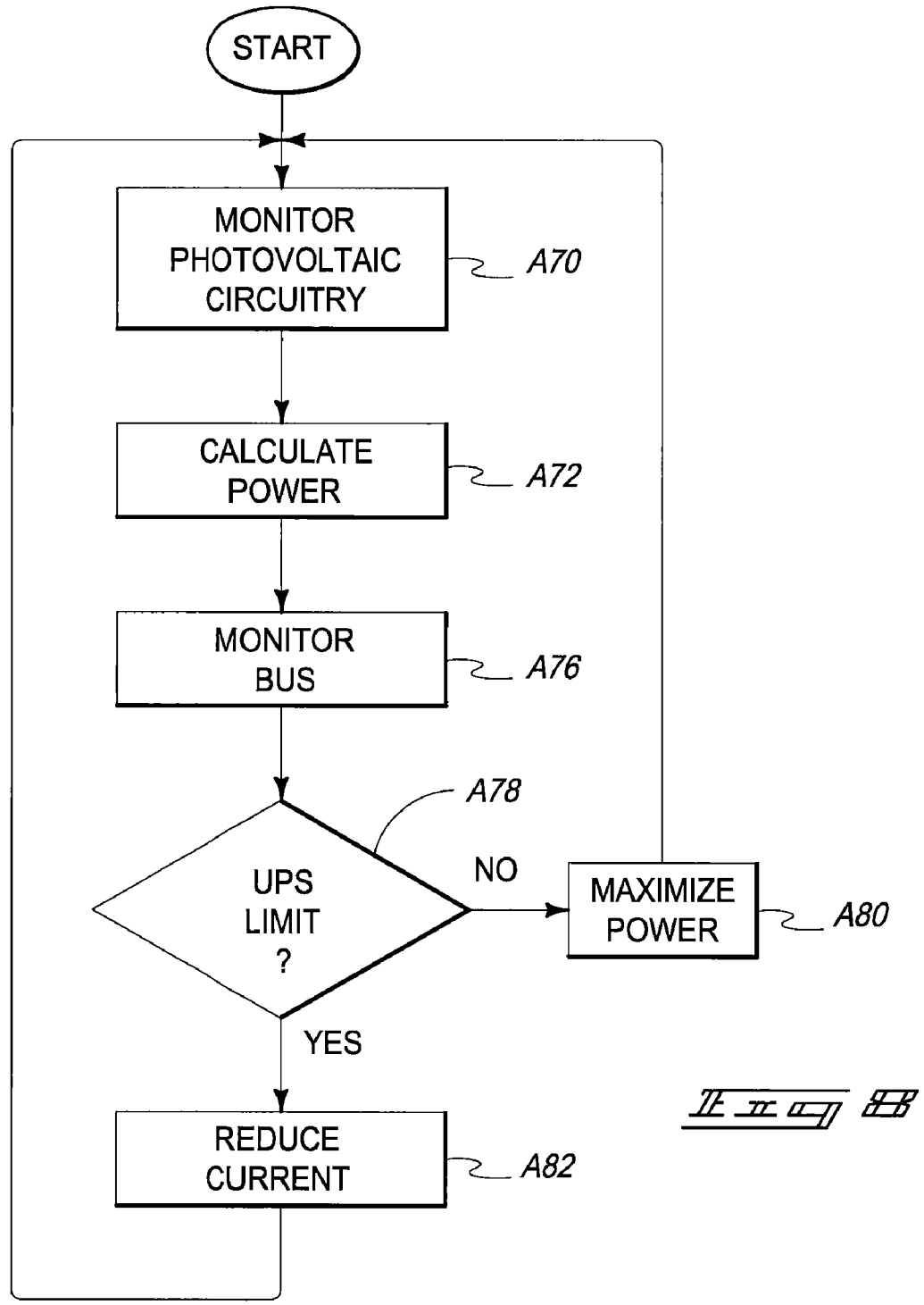

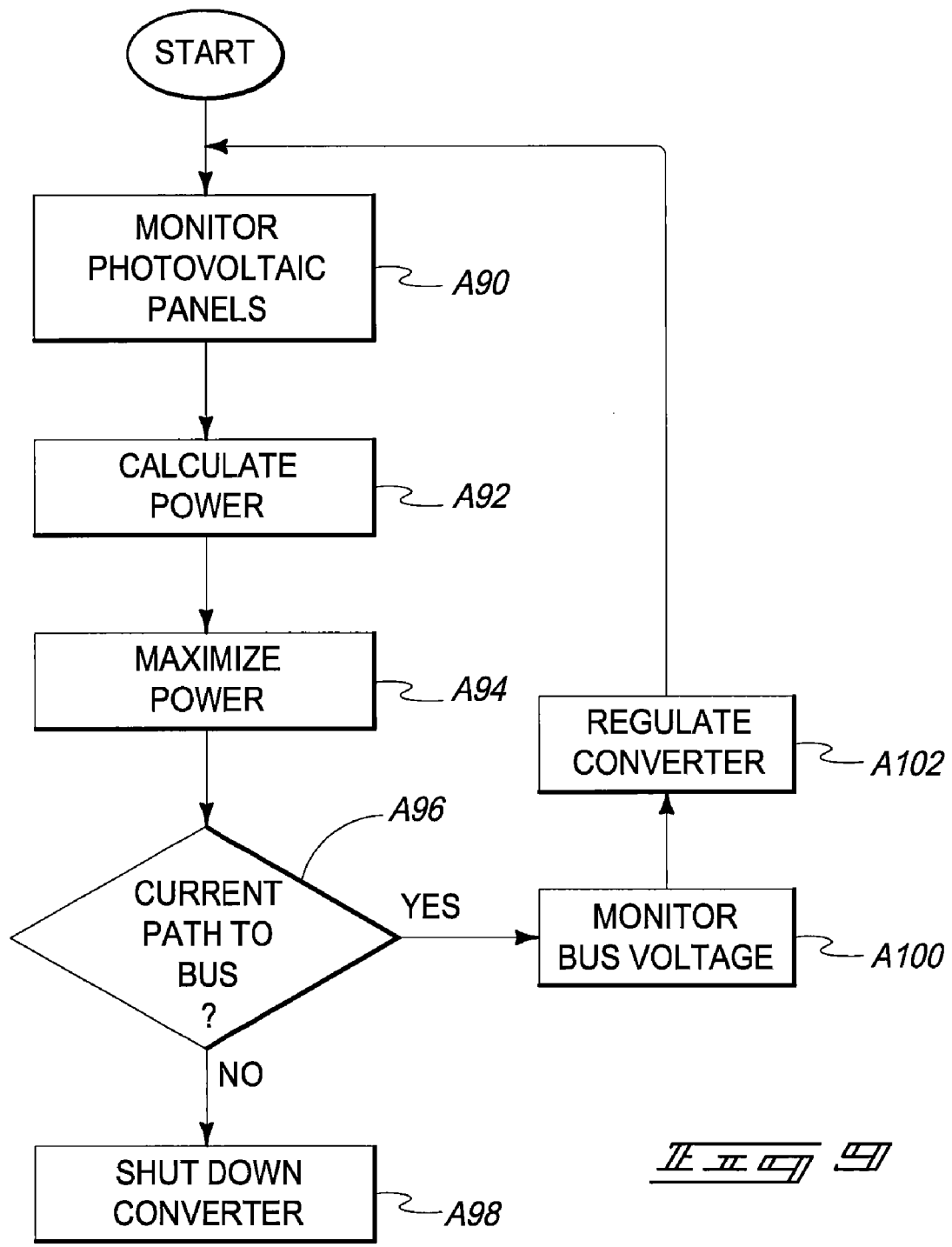

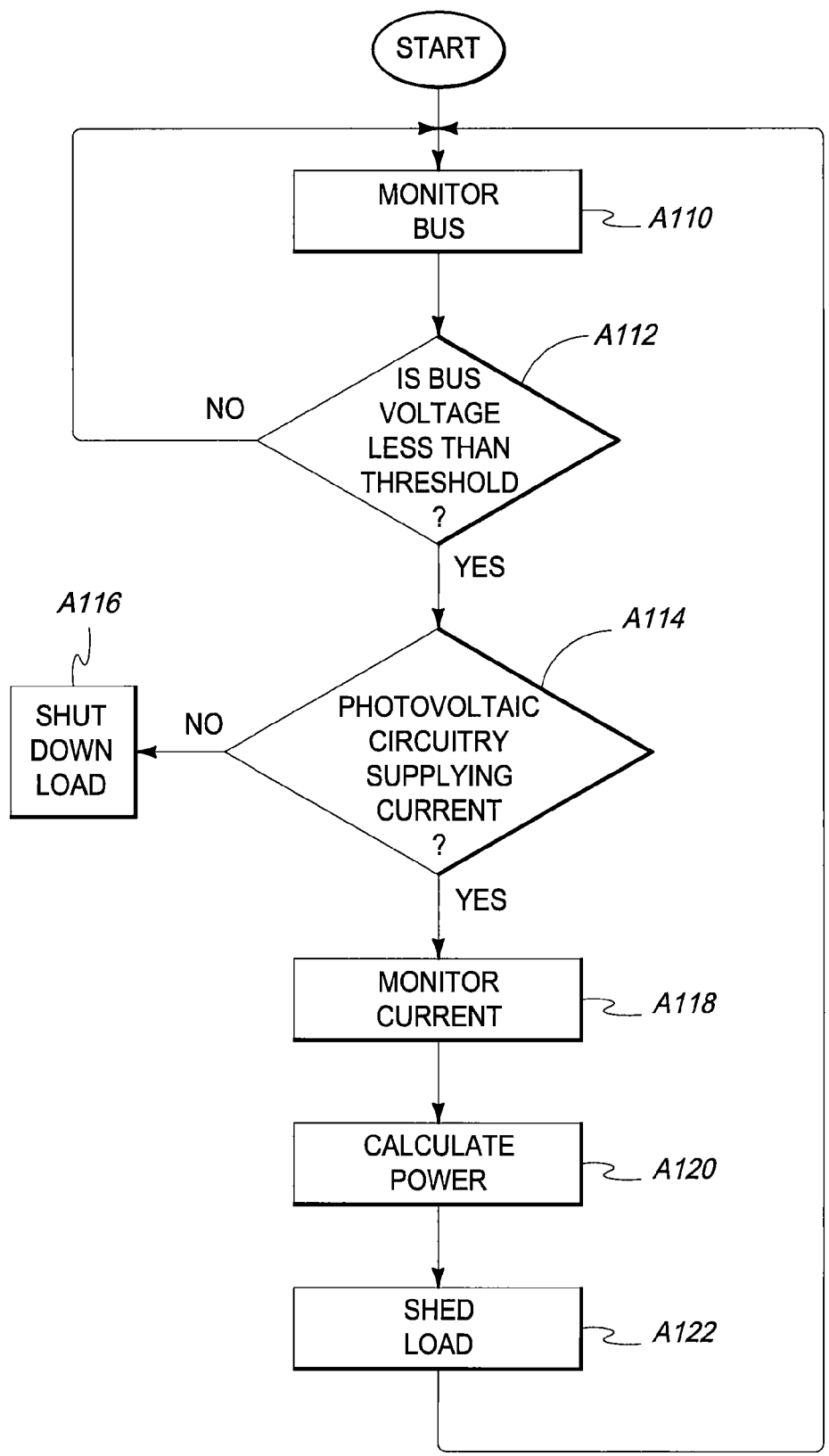

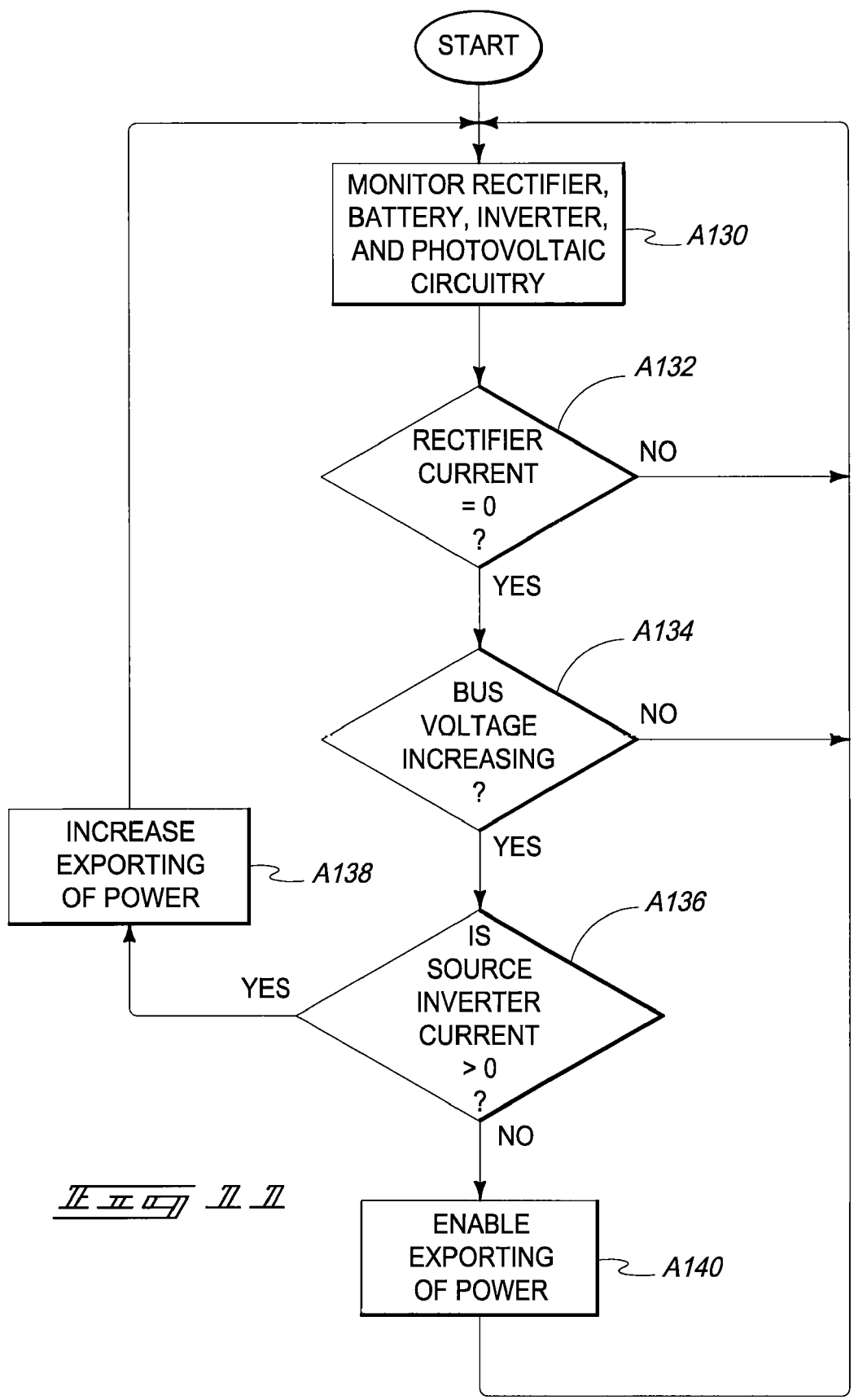

UNINTERRUPTIBLE POWER SUPPLIES, SOLAR POWER KITS FOR UNINTERRUPTIBLE POWER SUPPLIES AND RELATED METHODS

PRIORITY CLAIM

The present application claims priority to U.S. Provisional Patent Application Ser. No. 61/133,702 filed on Jul. 2, 2008, entitled "Uninterruptible Power Supply Incorporating Photovoltaic Input", naming Paul Regis Barlock and Matthew Kenneth Donnelly as inventors, incorporated herein by reference.

TECHNICAL FIELD

This disclosure relates to uninterruptible power supplies, solar power kits for uninterruptible power supplies and related methods.

BACKGROUND OF THE DISCLOSURE

Uninterruptible power supplies (UPSs) are commonly employed to supply reliable power to one or more electrical loads. An uninterruptible power supply stores energy, typically within a collection of batteries, and delivers the stored energy to the electrical loads during a period of time when power from the primary power source, typically the electric power grid, is not available. In an on-line uninterruptible power supply, the uninterruptible power supply converts AC input power from the primary source to DC power and DC circuitry within the uninterruptible power supply converts the DC power to an AC output connected to the electrical loads. The collection of batteries are used to store energy in the uninterruptible power supply.

Photovoltaic devices are used to generate electrical power from ambient light. Photovoltaic devices are commonly used to power consuming loads such as lighting, heating, or to operate communications equipment. Photovoltaic devices may also be directly connected to the grid via a grid-connected inverter.

Uninterruptible power supplies are sometimes characterized by their efficiency at converting from AC power to DC power and DC power to AC power. A higher efficiency implies less wasted energy, less heat generated by the process, and greater financial savings. Similarly, photovoltaic applications are also often characterized by their efficiency at converting light to useful electrical energy. Higher efficiency implies a better use of the capital dollars expended to install the photovoltaic system.

Uninterruptible power supplies are also sometimes characterized by the duration of their ability to deliver energy in a form and manner suitable for use by a load in the event of a power failure.

At least some aspects of the present disclosure are directed to methods and apparatus for uninterruptible power supplies which incorporate photovoltaic devices and solar power kits.

BRIEF DESCRIPTION OF THE DRAWINGS

Exemplary embodiments of the disclosure are described below with reference to the following accompanying drawings.

FIG. 2 is a functional block diagram of photovoltaic circuitry of an uninterruptible power supply according to one embodiment.

FIG. 3 is a functional block diagram of a kit including photovoltaic circuitry for use with an uninterruptible power supply according to one embodiment.

FIG. 4 is a flow chart of a method of controlling a rectifier of an uninterruptible power supply according to one embodiment.

FIG. 5 is a flow chart of a method of controlling a rectifier of an uninterruptible power supply according to one embodiment.

FIG. 6 is a flow chart of a method estimating runtime of an uninterruptible power supply according to one embodiment.

FIG. 7 is a flow chart of a method of controlling photovoltaic circuitry of an uninterruptible power supply according to one embodiment.

FIG. 8 is a flow chart of a method of controlling photovoltaic circuitry of an uninterruptible power supply according to one embodiment.

FIG. 9 is a flow chart of a method implemented by a kit including photovoltaic circuitry for use with an uninterruptible power supply according to one embodiment.

FIG. 10 is a flow chart of a method of controlling an inverter of an uninterruptible power supply according to one embodiment.

FIG. 11 is a flow chart of a method of controlling an export of electrical energy from an uninterruptible power supply according to one embodiment.

DETAILED DESCRIPTION OF THE DISCLOSURE

Figure 1:
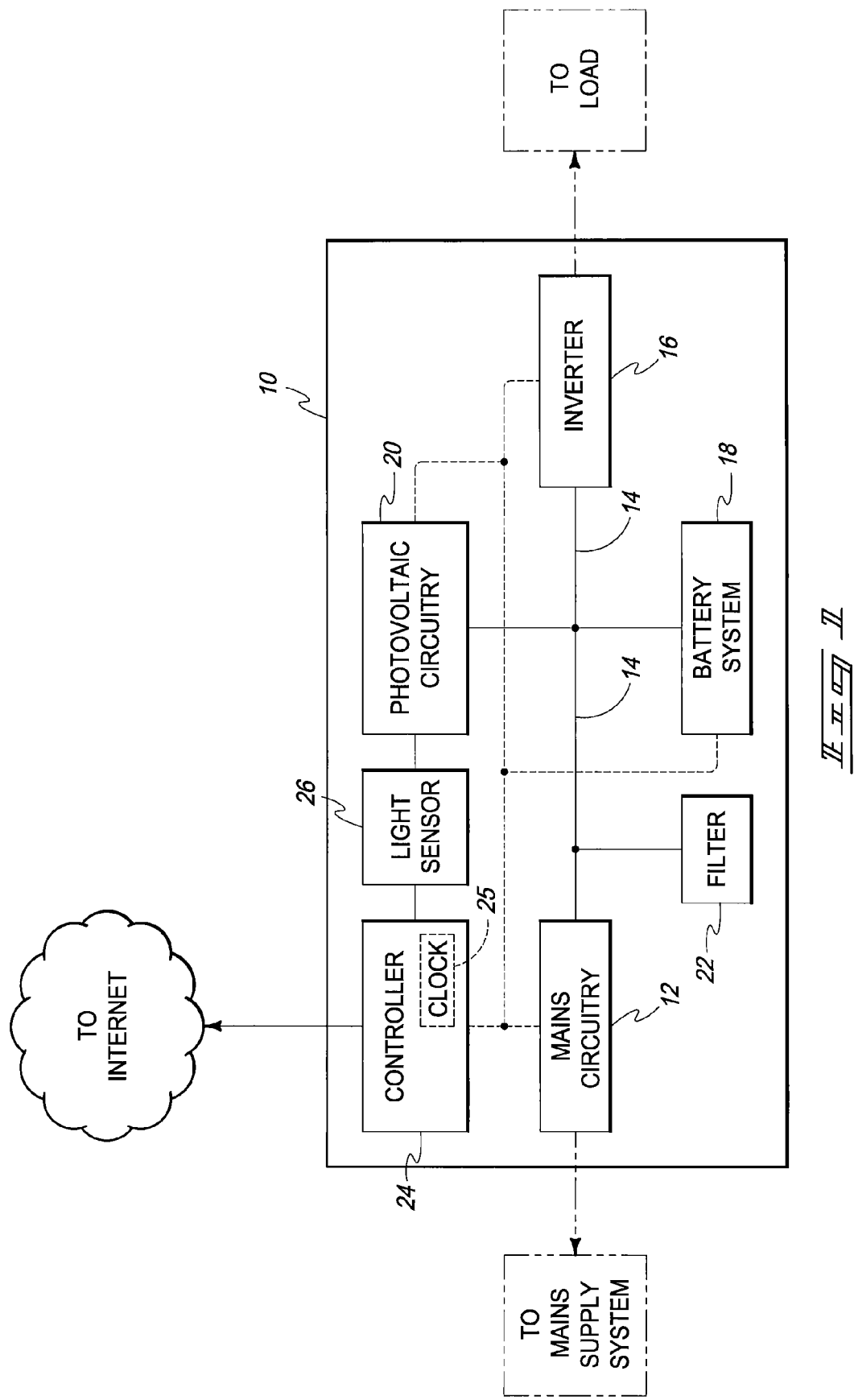
FIG. 1 is a functional block diagram of an uninterruptible power supply according to one embodiment.

This disclosure is submitted in furtherance of the constitutional purposes of the U.S. Patent Laws "to promote the progress of science and useful arts" (Article 1, Section 8).

According to some embodiments of the disclosure, uninterruptible power supplies, kits for use with uninterruptible power supplies, methods for supplying power, and uninterruptible power supply operational methods are described. Photovoltaic circuitry is used to provide electrical energy to an uninterruptible power supply in one embodiment. Methods of implementing the use of photovoltaic circuitry with uninterruptible power supplies are described in some arrangements. According to some embodiments, uninterruptible power supplies are configured to provide emergency back-up power to commercial establishments (e.g., providing power to computer equipment of a web-based company in but one illustrative example). Additional embodiments are described below.

According to one embodiment, an uninterruptible power supply comprises a power bus, mains circuitry configured to rectify electrical energy received from a mains supply system into rectified electrical energy and to provide the rectified electrical energy to a power bus of the uninterruptible power supply, photovoltaic circuitry configured to convert solar energy into converted electrical energy and to provide the converted electrical energy to the power bus, a battery system configured to receive electrical energy from the power bus to charge a battery of the battery system and to discharge electrical energy to the power bus, an inverter configured to provide electrical energy from the power bus to the load, and a controller configured to monitor the photovoltaic circuitry and to implement at least one operation of the uninterruptible power supply using the monitoring.

According to an additional embodiment, an uninterruptible power supply comprises mains circuitry configured to rectify electrical energy received from a mains supply system into rectified electrical energy and to provide the rectified electrical energy to supply circuitry of the uninterruptible power supply, photovoltaic circuitry configured to convert solar energy into converted electrical energy and to provide the converted electrical energy to the supply circuitry, a battery system configured to receive electrical energy from the supply circuitry to charge a battery of the battery system and to discharge electrical energy to the supply circuitry, an inverter configured to provide electrical energy from the supply circuitry to the load during periods of time when the rectifier is providing the rectified electrical energy and during periods of time when the rectifier is not providing the rectified electrical energy, and a controller configured to monitor the photovoltaic circuitry and to implement at least one operation of the uninterruptible power supply using the monitoring.

According to an another embodiment, an uninterruptible power supply comprises a power bus, a rectifier configured to rectify electrical energy from a mains supply system into rectified electrical energy and to provide the rectified electrical energy to the power bus, photovoltaic circuitry configured to convert solar energy into converted electrical energy and to provide the converted electrical energy to the power bus, a battery system configured to receive electrical energy from the power bus to charge a battery of the battery system and to discharge electrical energy to the power bus, an inverter configured to provide electrical energy from the power bus to the load, and a controller configured to monitor the uninterruptible power supply and to control an amount of the converted electrical energy provided by the photovoltaic circuitry to the power bus using the monitoring.

According to yet another embodiment, a solar power kit for an uninterruptible power supply comprises photovoltaic panels configured to convert solar energy into electrical energy, a dc-to-dc converter coupled with the photovoltaic panels and configured to convert a voltage of the electrical energy from the photovoltaic panels to a different voltage to provide converted electrical energy, and interface circuitry configured to couple with a power bus of an uninterruptible power supply and to provide the converted electrical energy to the power bus of the uninterruptible power supply.

Referring to FIG. 1, an example embodiment of an uninterruptible power supply 10 is shown. The depicted uninterruptible power supply 10 is configured to provide electrical energy to a load during the presence of suitable electrical energy from a mains supply system (i.e., normal operational mode) and during the absence of suitable electrical energy from the mains supply system (i.e., emergency or back-up operational mode) and may be referred to as an on-line uninterruptible power supply. Other embodiments are directed to off-line uninterruptible power supplies.

The illustrated uninterruptible power supply 10 includes mains circuitry 12, a power bus 14, an inverter 16, a battery system 18, photovoltaic (PV) circuitry 20, a filter 22 and a controller 24. The illustrated components of uninterruptible power supply 10 may be provided within a common housing in one embodiment. Other embodiments of uninterruptible power supply 10 are possible including additional, less and/or alternative components. For example, additional components (e.g., a capacitor bank) may be coupled with power bus 14 and/or the filter 22 may be deleted in some implementations. Furthermore, as discussed below in one example, photovoltaic circuitry 20 may be provided in a separate kit configured to couple with existing uninterruptible power supply configurations which previously did not utilize nor include photovoltaic circuitry.

Mains circuitry 12 is configured to couple the uninterruptible power supply 10 with a mains supply system, such as an electrical energy power distribution grid, configured to deliver electrical energy to uninterruptible power supply 10. In one embodiment implemented in the United States, the mains supply system provides AC electrical energy at a frequency of 60 Hz.

In one embodiment, mains circuitry 12 includes a rectifier configured to rectify received AC electrical energy from the mains supply system into rectified DC electrical energy. In one embodiment, the rectifier provides the DC electrical energy to the power bus 14 and the rectifier regulates the voltage of power bus 14 as described in additional below.

In another embodiment, mains circuitry 12 is also configured to export AC electrical energy to the mains supply system. In one example configuration, mains circuitry 12 comprises a bi-directional converter configured to function as the rectifier above to provide DC electrical energy to power bus 14 from the mains supply system at some moments in time. In other moments in time, the bi-directional converter is configured as an inverter to provide AC electrical energy from power bus 14 to the mains supply system. In another example configuration, the mains circuitry 12 may include the rectifier described above, as well as a source inverter configured to export AC electrical energy to the mains supply system. Controller 24 is configured to control the mains circuitry 12 in one embodiment. For example, if the amount of energy delivered to the load(s) is greater than the amount of energy delivered by the photovoltaic circuitry 20, the mains circuitry 12 may operate to provide electrical energy from the mains supply system to power bus 14. If the amount of energy delivered to the load(s) is less than the amount of energy delivered by the photovoltaic circuitry 20, the mains circuitry 12 may provide electrical energy back to the mains supply system.

Furthermore, controller 24 may monitor the electrical energy provided by the mains supply system to determine whether operation in normal or emergency modes of operation is appropriate. In one embodiment, controller 24 compares the voltage of the electrical energy received by the mains supply system with a threshold (e.g., 110 VAC), and operates the uninterruptible power supply 10 in the normal operational mode if the energy exceeds the threshold and operates the uninterruptible power supply 10 in the emergency operational mode if the energy is less than the threshold. Additional details and embodiments are discussed below.

In one embodiment, power bus 14 is a DC power bus configured to communicate DC electrical energy between various components of uninterruptible power supply 10. In one embodiment, the rectifier regulates the voltage of the power bus 14 during normal mode operations. In one example, the voltage of the power bus 14 may be in a range of 350-420V for loads in a range of 220-240V. In one embodiment, the power bus 14 is not regulated (i.e., by the rectifier or otherwise) during emergency mode operations.

Power bus 14 is one embodiment of supply circuitry which may be used to receive and to transport electrical energy power within uninterruptible power supply 10. In other embodiments, other arrangements of supply circuitry apart from a common power bus may be used. For example, one or more discrete connectors may be used to transport electrical energy between various components of the uninterruptible power supply 10 in other embodiments.

Inverter 16 is configured to convert DC electrical energy from power bus 14 into AC electrical energy for powering one or more AC loads of a system being protected by uninterruptible power supply 10. In illustrative examples, inverter 16 may provide different electrical energy according to the configurations of the load(s) in different applications. For example, inverter 16 may provide electrical energy at 120 VAC (single phase), 240 VAC (split phase), 208 VAC (3 phase) and 460 VAC (3 phase) in some examples. Accordingly, in one embodiment, inverter 16 provides electrical energy from the power bus 14 to one or more loads.

In one embodiment, inverter 16 includes a plurality of circuits which may be individually powered up or down providing control of an amount of load being powered by uninterruptible power supply 10 at a given moment in time. The load(s) receive electrical energy from inverter 16 regardless of the source(s) of the energy (e.g., mains supply system, battery system 18, and/or photovoltaic circuitry 20). The total energy provided to the load(s) may result from a plurality of the sources and the proportion of any single source being dependent upon a number of factors, such as the amount of light being received by the photovoltaic circuitry 20, the condition of the mains supply system, the state of the batteries, and the amount of energy being consumed by the load(s) in one embodiment.

Battery system 18 comprises one or more battery which may individually include one or more cells. In typical arrangements of uninterruptible power supply 10, battery system 18 includes a plurality of batteries which are arranged in different series and parallel configurations to provide sufficient electrical energy to power the loads. In some implementations, 150 lead-acid cells may be coupled in series in a battery string to provide appropriate voltage to power bus 14. Additional strings of batteries may be used to increase the capacity of the uninterruptible power supply 10. Battery system 18 may also include charger circuitry configured to equalize the batteries and charge (e.g., full or float) the batteries using electrical energy from power bus 14. Accordingly, in one embodiment, battery system 18 uses electrical energy from the power bus 14 to charge batteries of the battery system 18 during normal operational modes. During emergency modes of operation, the batteries of the battery system 18 may discharge DC electrical energy to the power bus 14 or receive electrical energy from photovoltaic circuitry 20.

In one embodiment, battery system 18 may be provided in a housing separate from a housing of the uninterruptible power supply 10 and coupled with power bus 14. In one additional example, DC-to-DC converter 32 may also be provided with the separate battery system 18.

Photovoltaic circuitry 20 is configured to provide DC electrical energy to power bus 14 from solar energy received by one or more photovoltaic panels 30 of FIG. 2 of the circuitry 20. As discussed below with respect to FIG. 2, photovoltaic circuitry 20 may also include, in one embodiment, include a DC-to-DC converter 32 and a contactor 34. Accordingly, in one embodiment, the photovoltaic circuitry 20 converts solar energy into converted electrical energy (e.g., DC electrical energy) and provides the converted electrical energy to the power bus 14.

Filter 22 is configured to smooth perturbations delivered to the power bus 14 by mains circuitry 12, inverter 16, and photovoltaic circuitry 20.

Controller 24 is configured to monitor and control operations of uninterruptible power supply 10 in one implementation. For example, controller 24 may monitor the rectifier of mains circuitry 12, the power bus 14, the inverter 16, the battery system 18 and the photovoltaic circuitry 20 in one embodiment. Controller 24 is configured to control regulation of power bus 14 by the rectifier, powering of loads via inverter 16, battery charge and discharge operations of battery system 18 and power output of photovoltaic circuitry 20 in one embodiment. Controller 24 may also control the exporting of electrical energy from uninterruptible power supply 10 to the mains supply system in one embodiment. Controller 24 may perform calculations, such as estimating the runtime of uninterruptible power supply 10 in the emergency operational mode, in one embodiment.

According to some embodiments, the controller 24 is configured to monitor the photovoltaic circuitry 20 and to implement and/or control at least one operation of the uninterruptible power supply using the monitoring of the photovoltaic circuitry 20. For example, in one embodiment, controller 24 monitors an amount of the DC electrical energy (e.g., DC current) provided by the photovoltaic circuitry 20 and controls an amount of the rectified electrical energy (e.g., DC current) provided by the rectifier to the power bus 14. Furthermore, the rectifier may be configured to regulate a voltage of the power bus 14 in one embodiment, and the controller 24 is configured to control the regulation of the power bus 14 by the rectifier in one configuration. In a more specific example, controller 24 controls the amount of electrical energy provided by the rectifier to the power bus 14 at an appropriate voltage and quantity to meet the demands of the batteries and inverter 16 net the energy supplied by the photovoltaic circuitry 20.

In another embodiment, the controller 24 monitors an amount of the DC electrical energy provided by the photovoltaic circuitry 20 and controls shedding of a portion of the load receiving power from the uninterruptible power supply. As described in detail below according to one embodiment, the controller sheds the portion of the load so that a remaining portion of the load receiving electrical energy from the inverter 16 corresponds to the amount of the DC electrical energy provided by the photovoltaic circuitry 20. Load shedding may be implemented during emergency modes of operation in one embodiment.

In another embodiment, the controller 24 monitors the uninterruptible power supply 10 and controls an amount of electrical energy provided by the photovoltaic circuitry 20 to the power bus 14. For example, the controller monitors a voltage of the power bus 14 and controls an amount of electrical energy provided by a DC-to-DC converter (e.g., converter 32 of FIG. 2) of the photovoltaic circuitry 20 to the power bus 14 using the monitored voltage of the power bus 14. In one more specific embodiment, the controller 24 is configured to reduce an amount of the electrical energy provided by the photovoltaic circuitry 20 to the power bus 14 as a result of the voltage of the power bus 14 exceeding a threshold.

In another embodiment, the controller 24 is configured to use information regarding the photovoltaic circuitry 20 to determine information regarding the provision of electrical energy from the uninterruptible power supply 10 to a load. In a more specific example, the controller 24 is configured to estimate a runtime of the uninterruptible power supply 10 (e.g., determine a remaining period of time the uninterruptible power supply 10 can provide electrical energy to the load during an emergency operational mode). In one implementation, controller 24 may access information regarding a quantity of light present at the uninterruptible power supply 10 using light sensor 26 to estimate the runtime. Controller 24 may also access information regarding an amount of electrical energy provided by the photovoltaic circuitry 20 to the power bus 14 to estimate the runtime.

In one embodiment, controller 24 may estimate an amount of light expected to be received by the photovoltaic circuitry 20 in the future to calculate the runtime. For example, in one embodiment, controller 24 may also utilize temporal information (e.g., time and date information), information regarding a geographical location of system 10, and information regarding a weather forecast of the environment where the uninterruptible power supply 10 is implemented to estimate the amount of electrical energy which may be provided by the photovoltaic circuitry 20 in the future and use the information to estimate the runtime. In one illustrative example, the controller 24 may access information regarding remaining hours of daylight (e.g., using time and date and geographical location information) and also weather forecast information to determine whether the weather will be sunny or cloudy to estimate the amount of energy provided by the photovoltaic circuitry 20.

In another embodiment described in further detail below, the controller 24 is configured to control the export of electrical energy from the power bus 14 to the mains supply system. For example, electrical energy from the power bus 14 may be provided to the mains supply system if excessive electrical energy is being provided by the photovoltaic circuitry 20.

In one implementation, the controller 24 is configured to automatically implement and/or control operations of the uninterruptible power supply 10 in an absence of user input instructing the controller 24 to implement or control the operations.

Controller 24 includes a clock 25 configured to provide temporal (e.g., date and time information) in one embodiment. In addition, controller 24 may also be coupled with an external network, such as the Internet. In one embodiment, controller 24 may obtain information regarding the environment where the uninterruptible power supply 10 is being used. For example, controller 24 may obtain information regarding an amount and duration of sunlight available at uninterruptible power supply 10. The controller 24 also may obtain weather forecast information for the location of use of uninterruptible power supply 10 (e.g., using GPS coordinates). This information may be used for calculations, for example, to determine a runtime of uninterruptible power supply 10 in emergency mode as described above.

In one embodiment, controller 24 comprises processing circuitry (not shown). In one embodiment, processing circuitry is arranged to process data, control data access and storage, issue commands, and control other desired operations. Processing circuitry may comprise circuitry configured to implement desired programming provided by appropriate media in at least one embodiment. For example, the processing circuitry may be implemented as one or more of processor(s) and/or other structure configured to execute executable instructions including, for example, software and/or firmware instructions, and/or hardware circuitry. Exemplary embodiments of processing circuitry include hardware logic, PGA, FPGA, ASIC, state machines, and/or other structures alone or in combination with a processor. These examples of processing circuitry are for illustration and other configurations are possible. In one embodiment, the controller 24 may be implemented as a distributed control system comprising a plurality of different controllers for one or more of mains circuitry 12, inverter 16, battery system 18, and photovoltaic circuitry 20. Other configurations of controller 24 are possible.

The controller 24 may also include storage circuitry in one embodiment. The storage circuitry is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry described above and configured to control appropriate processing circuitry. For example, programming may be provided via appropriate media including, for example, embodied within articles of manufacture.

Uninterruptible power supply 10 may also include a light sensor 26 in one embodiment. Light sensor 26 is configured to provide an output indicative of an amount of light present at the photovoltaic circuitry 20 in one embodiment.

Referring to FIG. 2, and as mentioned above, one embodiment of photovoltaic circuitry 20 includes one or more photovoltaic panels 30 which are configured to output DC electrical energy as a result of the photovoltaic panels 30 receiving light.

DC-to-DC converter 32 is configured to convert a voltage of DC electrical energy from photovoltaic panels 30 to a desired DC output voltage for application to power bus 14. In one embodiment, DC-to-DC converter 32 is configured to receive DC electrical energy from the panels 30 having a voltage of approximately 300 VDC in peak sunlight and to provide DC electrical energy having a voltage of approximately 360 VDC.

Contactor 34 is configured to selectively electrically isolate the DC-to-DC converter 32 from the power bus 14 of uninterruptible power supply 10 in one embodiment. In some examples, contactor 34 may be opened to electrically isolate DC-to-DC converter 32 from the power bus 14 during the absence of light at photovoltaic panels 30 or if the voltage of the power bus 14 exceeds a threshold. Contactor 34 may be controlled by controller 24 in one embodiment.

In one embodiment, uninterruptible power supply 10 may operate in a plurality of different modes during normal or emergency modes of operation. For example, during normal operational modes, no light may be present and the entirety of the power consumed by the loads may be provided by the mains supply system, or alternatively, light may be present and both the photovoltaic circuitry 20 and mains supply system may provide the energy which is consumed by the loads. The batteries of battery system 18 may be charged during the normal operational modes.

In another example, the amount of energy provided by the photovoltaic circuitry 20 may exceed the amount of energy consumed by the load and the uninterruptible power supply 10 may export power to the mains supply system in one embodiment.

During an absence of energy from the mains supply system (i.e., emergency operational modes), the battery system 18 may provide an entirety of the electrical energy to the loads if no light is present, or alternatively, the photovoltaic circuitry 20 may provide a portion (in combination with the batteries) or the entirety of the electrical energy to the loads if light is present. The controller 24 may monitor the battery system 18 during emergency operational modes and cease delivery of energy to the load(s) from the uninterruptible power supply

10 if appropriate (e.g., shut down the inverter 16 if the voltage of the power bus 14 falls below a threshold). In one example, if the power bus 14 is typically provided at 380 VDC, the controller 24 may disable the inverter 16 if the voltage of power bus 14 falls below 275 VDC in one example. If light is present, photovoltaic circuitry 20 may continue to provide electrical energy to power bus 14 even if the inverter 16 is disabled to charge the batteries of battery system 18 in one embodiment.

Figure 3A:
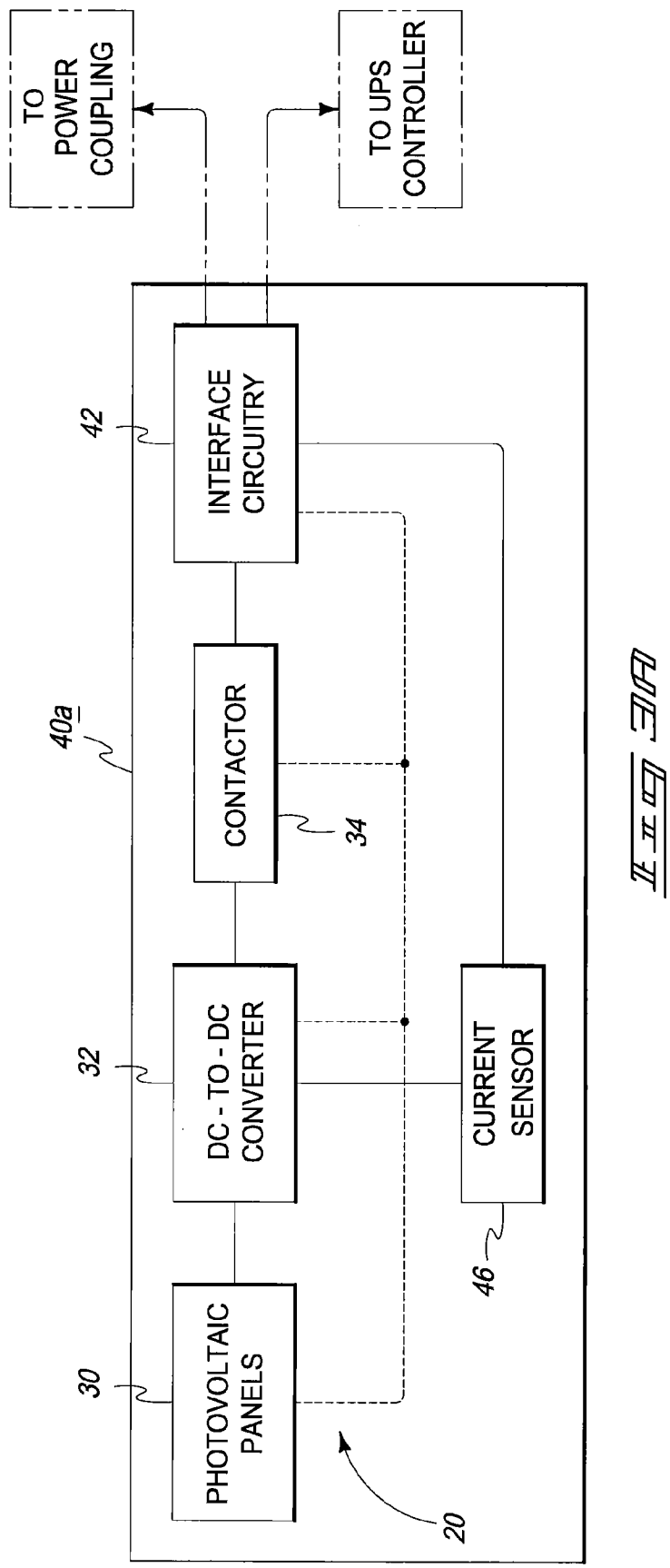
FIG. 3A is a functional block diagram of a kit including photovoltaic circuitry for use with an uninterruptible power supply according to one embodiment.

Referring to FIGS. 3 and 3A, the photovoltaic circuitry 20 may be implemented within a solar power kit 40 (FIG. 3) or kit 40a (FIG. 3A). For example, kits 40, 40a may be configured for use with existing uninterruptible power supplies which do not include photovoltaic circuitry 20. In the illustrative embodiments, kits 40, 40a individually include one or more photovoltaic panels 30, a DC-to-DC converter 32, contactor 34, and interface circuitry 42. Other kit embodiments are possible including more, less and/or alternative components. For example, the contactor 34 may be omitted from kits 40, 40a and included in system 10 in one embodiment.

Interface circuitry 42 is configured to communicate DC electrical energy generated by voltaic circuitry 20 to power bus 14 of uninterruptible power supply 10 via a power coupling of uninterruptible power supply 10 to power bus 14. Furthermore, interface circuitry 42 may also provide appropriate data connections to controller 24 or other appropriate circuitry in some embodiments. Although not shown, kits 40, 40a may also include a light sensor.

Referring to the embodiment of FIG. 3, kit 40 may include a dedicated controller 44 which may be configured similarly as controller 24 and communicate with controller 24 of uninterruptible power supply 10. In one embodiment, controller 44 provides information regarding DC electrical energy being generated by panels 30 and outputted by converter 32. Controller 44 may also control contactor 34, for example, responsive to commands from uninterruptible power supply 10 in one embodiment. In an additional example, the controller 44 may regulate the photovoltaic panels 30 to extract maximum energy from the photovoltaic panels 30. In one embodiment, the controller 44 may implement a maximum power point tracking algorithm to regulate the photovoltaic panels 30. In one illustrative example, the controller 44 may adjust the voltage of the photovoltaic panels 30 and determine whether power increases or decreases. Thereafter, the voltage of the photovoltaic panels 30 may be adjusted further to maximize power in one embodiment. In other embodiments (e.g., where the photovoltaic circuitry 20 is implemented within the uninterruptible power supply 10), controller 24 may provide the control of circuitry 20. In some embodiments, the controller 44 does not communicate with controller 24 and the connection of the interface circuitry 42 to the controller 24 may be omitted.

Referring to the embodiment of FIG. 3A, the controller 44 is omitted and monitoring and control may be implemented using controller 24 of uninterruptible power supply 10. Kit 40a includes a current sensor 46 which may provide information regarding quantities of current being generated by panels 30 and outputted by converter 32 to the power bus 14. Controller 24 may read the information from sensor 46 in one embodiment. In another example, sensor 46 and contactor 34 are embodied within circuitry of uninterruptible power supply 10 (e.g., within a power coupling of uninterruptible power supply 10 configured to couple with the photovoltaic circuitry kits 40, 40a).

In some arrangements, it may be desired to service one or more components of the uninterruptible power supply 10. In at least one embodiment, a switch (not shown) may be provided to couple the loads directly with the mains supply system and the components of the uninterruptible power supply may be de-energized, serviced, replaced, etc.

Referring to FIG. 4, an example of one possible method of controlling a rectifier of mains circuitry 12 is shown according to one embodiment. The method may be executed by controller 24 in one embodiment. In addition, other methods are possible, including more, less and/or alternative acts in other embodiments.

At an act A10, the rectifier is monitored. For example, information regarding voltage and current of AC electrical energy received from the mains supply system is accessed.

At an act A12, characteristics of the AC electrical energy are determined. For example, frequency, power and power factor of the electrical energy from the mains supply system may be determined in one embodiment.

At an act A14, it is determined whether the AC electrical energy from the mains supply system is present and within normal operational ranges (e.g., voltage and frequency). If so, the process controls operation of the uninterruptible power supply in the normal operational mode and returns to act A10. If the AC electrical energy is not present or not within normal operational ranges, the uninterruptible power supply is switched to emergency mode where electrical energy from the photovoltaic circuitry 20 and battery system 18 is supplied to the loads and the rectifier does not provide electrical energy to the power bus. The uninterruptible power supply may be return to the normal operational mode once acceptable AC electrical energy is available from the mains supply system.

Referring to FIG. 5, an example of one possible method of controlling the rectifier is shown according to one embodiment. The method may be executed by controller 24 in one embodiment. Other methods are possible, including more, less and/or alternative acts in other embodiments.

At an act A20, the rectifier output operation is monitored during the normal operational mode of the uninterruptible power supply. In one example, the controller monitors the DC voltage and current of electrical energy provided from the rectifier to power bus 14.

At an act A22, the batteries of the battery system are monitored. For example, the voltage of the batteries and current to/from the batteries are measured in one embodiment.

At an act A24, the load output of the inverter is monitored. In one example, the controller monitors the DC current of electrical energy being used from the bus to output AC electrical energy to the loads by the inverter.

At an act A26, the photovoltaic circuitry is monitored. In one example, the controller monitors the DC current of electrical energy being provided to the power bus by the DC-to-DC converter.

At an act A28, the runtime of the uninterruptible power supply in emergency operational mode is determined. In one example, the method of FIG. 6 is utilized to estimate the runtime. Furthermore, the controller may also determine the state of charge of the batteries of the battery system (e.g., using the information obtained at act A22 and a voltage profile of the batteries) in one embodiment.

At an act A30, the controller determines whether it is appropriate to fully charge, float charge or equalize the batteries.

At an act A32, the controller determines a battery charge current suitable to the battery mode of operation of act A30.

At an act A34, the controller determines an appropriate output of the rectifier. In one embodiment, the output of the DC current of the rectifier is set equal to the inverter current plus the desired battery current minus the current of the DC-to-DC converter.

At an Act A36, the controller regulates the voltage of the power bus of the uninterruptible power supply by controlling how much current is provided by the rectifier to the bus. In one embodiment, the rectifier is configured to provide an amount of current corresponding to the difference of the current being consumed (e.g., by the loads and charging the batteries) and the current being provided by the photovoltaic circuitry as mentioned above.

Referring to FIG. 6, an example of one possible method of estimating the runtime of the uninterruptible power supply in the emergency operational mode is shown according to one embodiment. The method may be executed by controller 24 in one embodiment. Other methods are possible, including more, less and/or alternative acts in other embodiments.

At an act A40, the DC voltage and current of the rectifier are determined, the DC current of the battery system is determined, the DC current of the inverter is determined, and the DC current and power delivered by the DC-to-DC converter to the power bus are determined. In addition, the power of electrical energy provided to the loads by the inverter may be determined in one embodiment.

At an act A42, the state of charge of the batteries of the battery system are determined. In some arrangements, historical data and modeling (e.g., age of the batteries) may be used to estimate the state of charge with the voltage of the batteries.

At an act A44, the runtime of the uninterruptible power supply is initially calculated net of solar energy. In one embodiment, the runtime is estimated by dividing the energy stored in the batteries (kWh) divided by the inverter power (kW) to supply the loads.

At an act A46, information is retrieved from an external network, such as the Internet. Example information may include retrieving weather forecast information using time, date and gps coordinate information regarding the location of the uninterruptible power supply.

At an act A48, an estimate of the amount of solar energy expected to be delivered by the DC-to-DC converter to the power bus is determined. In one embodiment, the estimate is calculated by extrapolating measured solar power plus or minus an estimation of predicted future solar power based upon temporal information (e.g. time of day, date), geographic location of the uninterruptible power supply and the weather forecast. For example, if the uninterruptible power supply is located in Washington state, then not much solar energy will be expected after 4:00 pm in December while solar energy may be available for another hour or two if the uninterruptible power supply is located in Arizona state. This estimation based upon a remaining amount of light may be modified by the forecast indicating whether the day will be sunny, partly cloudy or overcast. The time frame of the estimation is equal to the runtime estimate calculated in act A44 in one embodiment. For example, if the runtime estimated in act A44 is calculated to be 30 minutes, then the prediction window for the solar power estimate calculated in act A48 would be 30 minutes.

At an act A50, the runtime estimate of act A44 is refined using the estimate of the amount of solar energy expected to be delivered by the DC-to-DC converter to the power bus calculated in act A48. In one embodiment, the runtime calculated in act A44 is refined by adding an increment of time in an amount equal to the quotient of the solar energy estimated in act A48 (kWh) divided by the inverter power (kW) to supply the loads.

At an act A52, the runtime, solar energy estimate, inverter power, power bus voltage, battery current, DC-to-DC converter current, and DC-to-DC converter power may be displayed.

Referring to FIG. 7, an example of one possible method of controlling the photovoltaic circuitry is shown according to one embodiment. The method may be executed by controller 24 and/or controller 44 in one embodiment. Other methods are possible, including more, less and/or alternative acts in other embodiments.

At an act A60, the voltage of the power bus of the uninterruptible power supply is measured.

At an act A62, the charge mode of operation of the batteries of the uninterruptible power supply is determined. For example, it may be determined whether the batteries are being fully charged, float charged or equalized.

At an act A64, the controller determines whether the voltage of the power bus is less than a voltage threshold where the batteries may be damaged for the respective charge mode of operation of the batteries. For example, if the battery system includes lead-acid batteries, damage to the batteries may occur in float mode at sustained voltages of 2.4 Volts per cell.

The example process returns to act A60 if the condition of act A64 is affirmative indicating that the voltage of the bus is below the threshold and acceptable.

Otherwise, the process proceeds to an act A66 where the photovoltaic circuitry is disabled, for example, by opening the contactor coupling the photovoltaic circuitry with the power bus of the uninterruptible power supply. In another embodiment, the DC-to-DC converter may be instructed to reduce its output current to the power bus of the uninterruptible power supply. The operations of act A66 prevent the voltage of the power bus from going too high where the batteries may be damaged.

Referring to FIG. 8, an example of one possible method of controlling the DC-to-DC converter is shown according to one embodiment. The method may be executed by controller 24 or controller 44 in example embodiments. In one more specific example, the method of FIG. 8 is implemented in a kit embodiment with controller 44 of the kit communicating with controller 24 of the uninterruptible power supply. Other methods are possible, including more, less and/or alternative acts in other embodiments.

At an act A70, the photovoltaic circuitry is monitored. In one example, the DC voltage and current from the photovoltaic panels is determined.

At an act A72, the power from the photovoltaic panels is calculated.

At an act A76, the power bus of the uninterruptible power supply may be monitored. In one example, the DC voltage of the power bus is measured.

At an act A78, it is determined whether the uninterruptible power supply has requested a limit of current from the photovoltaic circuitry. This may happen in one example if the voltage of the power bus 14 increases to approach a maximum threshold value. In other words, the controller may request a current limit from photovoltaic circuitry 20 if the voltage of the power bus 14 increases unreasonably and to maintain the voltage of bus 14 below the maximum threshold value.

If the condition of act A78 is negative, the process proceeds to an act A80 where the photovoltaic panels may be regulated to extract maximum energy from the photovoltaic panels (e.g., using a maximum power point tracking algorithm) in one embodiment.

If the condition of act A78 is affirmative, the process proceeds to an act A82, to reduce the current from the DC-to-DC converter to match instruction from the uninterruptible power supply to limit the current from the photovoltaic circuitry. The operations of act A82 prevent the voltage of the power bus from going too high where the batteries may be damaged.

Referring to FIG. 9, another example of a possible method of controlling the DC-to-DC converter is shown according to one embodiment. The method may be executed by controller 24 or controller 44 in example embodiments. In one more specific example, the method of FIG. 9 is implemented in a kit embodiment by controller 44 without communications with controller 24 of the uninterruptible power supply. Other methods are possible, including more, less and/or alternative acts in other embodiments.

At an act A90, the photovoltaic circuitry is monitored. In one example, the DC voltage and current from the photovoltaic panels is determined.

At an act A92, the power from the photovoltaic panels is calculated.

At an act A94, the photovoltaic panels 30 may be regulated to extract maximum energy from the photovoltaic panels (e.g., using a maximum power point tracking algorithm).

At an act A96, it is determined whether there is a current path to the power bus of the uninterruptible power supply (e.g., the contactor is closed). The uninterruptible power supply may open the contactor if the voltage of the bus is too high.

If the condition of act A96 is negative, the process proceeds to an act A98 to shut down the DC-to-DC converter such that photovoltaic circuitry does not provide power.

If the condition of act A96 is affirmative, the process proceeds to an act A100 to monitor the voltage of the power bus of the uninterruptible power supply.

At an act A102, the output of the DC-to-DC converter is regulated. In one embodiment, the regulation matches the output power of the photovoltaic circuitry via the converter to the power generated by the photovoltaic panels (net of losses).

Referring to FIG. 10, an example of one possible method of controlling the shedding of a portion of the load coupled with the inverter is shown according to one embodiment. The method may be executed by controller 24 during emergency operational modes in an example embodiment. Other methods are possible, including more, less and/or alternative acts in other embodiments.

At an act A110, the voltage of the power bus of the uninterruptible power supply is determined.

At an act A112, it is determined whether the voltage of the power bus is too low by determining if the bus voltage is less than a battery-shut down threshold. For example, the shutdown voltage of a lead-acid battery bank is typically 1.75 V per cell.

The process returns to act A110 if the condition of act A112 is negative.

Otherwise, the process proceeds to an act A114 to determine whether the photovoltaic circuitry is supplying current.

If the condition of act A114 is negative, the inverter is controlled to shed all load at an act A116.

If the condition of act A114 is affirmative, the process proceeds to an act A118 to monitor current from the DC-to-DC converter of the photovoltaic circuitry.

At an act A120, the power from the photovoltaic circuitry is calculated (e.g., voltage times current).

At an act A122, at least a portion of the load coupled with the inverter may be shed. In one embodiment, the portion of the load is shed such that an amount of power remaining for other non-shed load is substantially equal to the power provided by the photovoltaic circuitry. In one embodiment, less important portions of the load may be shed prior to more important portions of the load (e.g., as specified by an operator). Furthermore, additional portions of the load may be shed and/or restored if the amount of power from the photovoltaic circuitry decreases or increases, respectively.

Referring to FIG. 11, an example of one possible method of controlling the exporting of electrical energy to the mains supply system is shown. The depicted method may be utilized to maintain a voltage of the power bus within an acceptable range. More specifically, the method may be executed if the photovoltaic circuitry is providing more energy than an amount of energy consumed by the load(s) and to avoid the voltage of the power bus from becoming excessive. The method may be executed by controller 24 in an example embodiment. Other methods are possible, including more, less and/or alternative acts in other embodiments.

At an act A130, the power bus voltage and current output of the rectifier are determined. Furthermore, the currents at the battery system, inverter and DC-to-DC converter are determined.

At an act A132, it is determined whether the current of the rectifier is zero.

The process returns to act A130 if the condition of act A132 is negative.

Otherwise, the process proceeds to an act A134 to determine whether the voltage of the power bus of the uninterruptible power supply is increasing. More specifically, in one embodiment, the controller continually reduces the current from the rectifier if there is excess power from the photovoltaic circuitry (i.e., the power from the photovoltaic circuitry exceeds the load output plus any charging of the batteries). Once the current from the rectifier has been reduced to zero, then the process proceeds to act A134.

The process returns to act A130 if the condition of act A134 is negative.

Otherwise, if the bus voltage is increasing, the process proceeds to an act A136 to determine whether a current from source inverter of the mains circuitry is greater than zero (i.e., whether the uninterruptible power supply is already outputting power to the mains supply system). The process proceeds to act A136 if the rectifier output is zero but the voltage of the power bus continues to increase indicating that there is an excess of power from the photovoltaic circuitry.

If the condition of act A136 is affirmative, the process proceeds to an act A138 to increase the export of power from the uninterruptible power supply to the mains supply system. The amount of electrical energy exported may continue to increase until the voltage of the power bus stops increasing in one embodiment. In one more specific example, the amount of electrical energy exported may correspond to the amount of energy being generated by the photovoltaic circuitry minus the amount of energy being delivered to the loads and used to charge the batteries of the battery system.

If the condition of act A136 is negative, the process proceeds to an act A140 to enable power exporting from the uninterruptible power supply and to start exporting a relatively small amount of power (e.g., 100 watts). In some embodiments, the uninterruptible power supply only exports electrical energy to the mains supply system if there is electrical energy upon the mains supply system to avoid providing electrical energy to the mains supply system in the presence of a failure upon the mains supply system. For example, in one embodiment, uninterruptible power supply 10 may export electrical energy with an adjusted frequency, and if the frequency of the mains supply system follows the adjustment of the frequency, then the mains supply system may have a failure and uninterruptible power supply 10 will not export energy to the mains supply system.

At least some embodiments of the present disclosure including photovoltaic circuitry with an uninterruptible power supply have the potential to improve the efficiency of the uninterruptible power supply when measured holistically. In some embodiments, the duration of the ability of the uninterruptible power supply to provide electrical energy to the load(s) during an emergency operational mode is extended with the implementation of the photovoltaic circuitry compared with arrangements where the batteries are the only source of electrical energy during emergency mode operations. In addition, according to some embodiments of the uninterruptible power supply, inrush currents to the batteries upon restoration of power from the mains supply system may be reduced compared with arrangements which do not utilize photovoltaic circuitry. In one embodiment, the rectifier carries less current compared with arrangements which do not utilize solar energy and accordingly may be more efficient compared with a rectifier carrying increased current. Furthermore, the overall reliability of the uninterruptible power supply is improved versus arrangements which do not include photovoltaic circuitry and carbon emissions may be reduced by replacing a portion of energy delivered to the load(s) from the mains supply system with carbon-free energy from the photovoltaic circuitry.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An uninterruptible power supply comprising:
   a power bus;
   mains circuitry configured to rectify electrical energy received from a mains supply system into rectified electrical energy and to provide the rectified electrical energy to the power bus;
   photovoltaic circuitry configured to convert solar energy into converted electrical energy and to provide the converted electrical energy to the power bus;
   a battery system configured to receive electrical energy from the power bus to charge a battery of the battery system and to discharge electrical energy to the power bus;
   an inverter configured to provide electrical energy from the power bus to a load;
   a controller configured to monitor the photovoltaic circuitry and to implement at least one operation of the uninterruptible power supply using the monitoring;
   wherein the controller is configured to implement the at least one operation comprising calculating a remaining period of time the uninterruptible power supply can provide the electrical energy from the power bus to the load during an emergency mode of operation when electrical energy is unavailable from the mains supply system; and
   a sensor configured to provide information regarding an amount of light present at the photovoltaic circuitry, and wherein the controller is configured to use the information regarding an amount of light present at the photovoltaic circuitry to determine the remaining period of time.

2. The supply of claim 1 wherein the controller is configured to monitor an amount of the converted electrical energy provided by the photovoltaic circuitry and to implement another operation comprising controlling an amount of the rectified electrical energy provided by the rectifier to the power bus.

3. The supply of claim 1 wherein the controller is configured to monitor an amount of the converted electrical energy provided by the photovoltaic circuitry and to implement another operation comprising controlling shedding of a portion of the load.

4. The supply of claim 3 wherein the controller is configured to shed the portion of the load so that a remaining portion of the load receiving the electrical energy from the inverter corresponds to the amount of the converted electrical energy provided by the photovoltaic circuitry.

5. The supply of claim 3 wherein the controller is configured to implement another operation comprising controlling shedding an entirety of the load.

6. The supply of claim 1 wherein the controller is configured to implement another operation comprising controlling an amount of electrical energy which is exported from the power bus to the mains supply system as a result of the monitoring of the photovoltaic circuitry.

7. The supply of claim 1 wherein the controller is a distributed controller comprising first processing circuitry in a kit comprising the photovoltaic circuitry and second processing circuitry external of the kit and configured to communicate with the first processing circuitry.

8. The supply of claim 1 wherein the rectifier is configured to regulate a voltage of the power bus.

9. The supply of claim 8 wherein the controller is configured to implement another operation comprising controlling the regulation of the voltage of the power bus by the rectifier.

10. The supply of claim 1 wherein the inverter is configured to provide the electrical energy from the power bus to the load during periods of time when the rectifier is providing the rectified electrical energy and during periods of time when the rectifier is not providing the rectified electrical energy.

11. The supply of claim 1 wherein the controller is configured to automatically implement the at least one operation in an absence of user input instructing the controller to implement the at least one operation.

12. The supply of claim 1 wherein the controller is configured to use information regarding an estimate of an amount of light to be received by the photovoltaic circuitry in the future to determine the remaining period of time.

13. The supply of claim 12 wherein the controller is configured to use geographical location information regarding a location of the photovoltaic circuitry to estimate the amount of light.

14. The supply of claim 13 wherein the controller is configured to use weather forecast information to estimate the amount of light.

15. The supply of claim 1 wherein the controller is configured to monitor an amount of converted electrical energy provided by the photovoltaic circuitry to the power bus to monitor the photovoltaic circuitry.

16. An uninterruptible power supply comprising:
a power bus;
a rectifier configured to rectify electrical energy from a mains supply system into rectified electrical energy and to provide the rectified electrical energy to the power bus;
photovoltaic circuitry configured to convert solar energy into converted electrical energy and to provide the converted electrical energy to the power bus;
a battery system configured to receive electrical energy from the power bus to charge a battery of the battery system and to discharge electrical energy to the power bus;
an inverter configured to provide electrical energy from the power bus to a load;
a controller configured to monitor the uninterruptible power supply and to vary an amount of the converted electrical energy provided by the photovoltaic circuitry to the power bus as a result of the monitoring of the uninterruptible power supply; and
wherein the controller is configured to monitor the power bus and to vary the amount of the converted electrical energy provided by the photovoltaic circuitry to the power bus as a result of the monitoring of the power bus.

17. The supply of claim 16 wherein the controller is configured to monitor a voltage of the power bus to monitor the power bus and to vary the amount of the converted electrical energy provided by the photovoltaic circuitry to the power bus as a result of the monitoring of the voltage of the power bus.

18. The supply of claim 17 wherein the controller is configured to reduce the amount of the converted electrical energy provided by the photovoltaic circuitry to the power bus as a result of the voltage of the power bus exceeding a threshold.

19. The supply of claim 17 wherein the controller is configured to cease the provision of the converted electrical energy from the photovoltaic circuitry to the power bus as a result of the voltage of the power bus exceeding a threshold.

20. A solar power kit for an uninterruptible power supply comprising:
at least one photovoltaic panel configured to convert solar energy into electrical energy;
a dc-to-dc converter coupled with the photovoltaic panel and configured to convert a voltage of the electrical energy from the photovoltaic panel to a different voltage to provide converted electrical energy;
interface circuitry configured to couple with a power bus of an uninterruptible power supply and to provide the converted electrical energy to the power bus of the uninterruptible power supply; and
a controller configured to access information regarding an electrical characteristic of the power bus and to control an amount of the converted electrical energy provided by the at least one photovoltaic panel to the power bus using the information regarding the electrical characteristic of the power bus.

21. The kit of claim 20 further comprising a sensor coupled with the interface circuitry and configured to provide information regarding an amount of the converted electrical energy being provided by the dc-to-dc converter and to communicate the information to the uninterruptible power supply using the interface circuitry.

22. The supply of claim 1 wherein the controller is configured to vary an amount of the rectified electrical energy provided by the mains circuitry to the power bus as a result of the monitoring of the photovoltaic circuitry.

23. The supply of claim 18 wherein the controller is configured to monitor circuitry of the uninterruptible power supply other than the photovoltaic circuitry and the power bus and to vary the amount of the converted electrical energy provided by the photovoltaic circuitry to the power bus as a result of the monitoring of the circuitry of the uninterruptible power supply other than the photovoltaic circuitry and the power bus.

* * * * *